United States Patent
Takei et al.

(10) Patent No.: US 8,951,666 B2
(45) Date of Patent: Feb. 10, 2015

(54) NICKEL HYDROGEN RECHARGEABLE BATTERY WITH RARE EARTH-MG-NI BASED HYDROGEN STORAGE

(71) Applicant: FDK Twicell Co., Ltd., Takasaki-shi, Gunma (JP)

(72) Inventors: Masaaki Takei, Takasaki (JP); Tetsuya Yamane, Takasaki (JP); Yuzo Imoto, Takasaki (JP); Takeshi Ito, Takasaki (JP); Masaru Takasu, Takasaki (JP)

(73) Assignee: FDK Twicell Co., Ltd., Takasaki-shi (JP)

( * ) Notice: Subject to any disclaimer, the term of this patent is extended or adjusted under 35 U.S.C. 154(b) by 113 days.

(21) Appl. No.: 13/838,023

(22) Filed: Mar. 15, 2013

(65) Prior Publication Data
US 2013/0260216 A1 Oct. 3, 2013

(30) Foreign Application Priority Data
Mar. 29, 2012 (JP) ................................. 2012-077939

(51) Int. Cl.
*H01M 4/46* (2006.01)
*H01M 4/48* (2010.01)
*H01M 10/26* (2006.01)
*H01M 4/32* (2006.01)
*H01M 4/36* (2006.01)
*H01M 4/38* (2006.01)
*H01M 10/34* (2006.01)

(52) U.S. Cl.
CPC ................ *H01M 4/466* (2013.01); *H01M 4/32* (2013.01); *H01M 4/366* (2013.01); *H01M 4/383* (2013.01); *H01M 10/345* (2013.01); *Y02E 60/124* (2013.01)
USPC .......................... 429/206; 429/223; 429/218.2

(58) Field of Classification Search
USPC .......... 429/223, 163, 218.1, 218.2, 231.5, 206
See application file for complete search history.

(56) References Cited

U.S. PATENT DOCUMENTS 5,077,149 A * 12/1991 Ikoma et al. .................. 429/101
5,455,125 A * 10/1995 Matsumoto et al. ............ 429/59
6,040,087 A * 3/2000 Kawakami ................. 429/218.1

(Continued)

FOREIGN PATENT DOCUMENTS

EP 0 866 510 A2 9/1998
EP 1 100 141 A1 5/2001

(Continued)

OTHER PUBLICATIONS

Extended European Search Report for EP 13161416.6, dated Jul. 16, 2013.

*Primary Examiner* — Kenneth Douyette
(74) *Attorney, Agent, or Firm* — Marshall, Gerstein & Borun LLP (57) ABSTRACT

A nickel hydrogen rechargeable battery contains an electrode group made up of positive and negative electrode put together with a separator intervening therebetween. The positive electrode includes positive-electrode active material particles each having a base particle composed mainly of nickel hydroxide and a conductive layer that covers the surface of the base particle and is made from a Co compound containing Li. The negative electrode includes a rare earth-Mg—Ni-based hydrogen storage alloy containing a rare-earth element, Mg and Ni. The total amount of Li contained in the battery is in a range of from 15 to 50 (mg/Ah) on the condition that the Li is converted into LiOH, and that the total amount of Li is found as a mass per Ah of positive electrode capacity.

17 Claims, 1 Drawing Sheet

(56) References Cited

U.S. PATENT DOCUMENTS

| | | | |
|---|---|---|---|
| 6,200,705 B1 * | 3/2001 | Hayashida et al. | 429/218.2 |
| 2002/0197530 A1 * | 12/2002 | Tani et al. | 429/218.2 |
| 2003/0017395 A1 | 1/2003 | Miki et al. | |
| 2004/0209166 A1 * | 10/2004 | Kihara | 429/218.2 |

FOREIGN PATENT DOCUMENTS

| | | |
|---|---|---|
| EP | 1 113 512 A1 | 7/2001 |
| JP | 62-237667 A | 10/1987 |
| JP | 11-149921 A | 6/1999 |

* cited by examiner

NICKEL HYDROGEN RECHARGEABLE BATTERY WITH RARE EARTH-MG-NI BASED HYDROGEN STORAGE

BACKGROUND OF THE INVENTION

1. Field of the Invention

The invention relates to a nickel hydrogen rechargeable battery.

2. Description of the Related Art

Nickel hydrogen rechargeable batteries have been used for various purposes and applied to a large variety of mobile electronic devices and the like, because of their higher capacity and their superiority in environmental safety, as compared to nickel-cadmium rechargeable batteries.

A non-sintered positive electrode is well known as a positive electrode used for the nickel hydrogen rechargeable batteries. The non-sintered positive electrode is fabricated, for example, in the following manner. First, positive paste is produced by kneading nickel hydroxide particles functioning as a positive-electrode active material, a binding agent, and water. A substrate having a 3D network-like framework structure and made of a nickel foam sheet is filled with the positive paste. The paste is subjected to a drying process, whereas the substrate undergoes a rolling process for the purpose of densifying positive mixture, thereby forming an intermediate product of a positive electrode. The intermediate product is then cut into predetermined size. This is how a non-sintered positive electrode is fabricated. An advantage of the non-sintered positive electrode is that it can be filled with the positive-electrode active material more densely than a sintered positive electrode.

On the other hand, although conventional non-sintered positive electrodes can be filled with active material, the utilization rate of the active material in the conventional non-sintered positive electrodes is low because nickel hydroxide particles functioning as active material have a relatively low conductivity. The low utilization rate of the active material causes the problem that cell reaction at charge and discharge is unlikely to smoothly progress.

A well-known method for increasing the utilization rate of the active material in a non-sintered positive electrode is to add a cobalt compound such as cobalt hydroxide powder to the positive mixture to make the cobalt compound function as a conducting agent (see Unexamined Japanese Patent Application Publication No. 62-237667, for example). If the positive electrode containing the nickel hydroxide as a positive-electrode active material and the cobalt compound as a conducting agent in the positive mixture is installed in a nickel hydrogen rechargeable battery, the cobalt compound dissolves in alkaline electrolyte in the form of cobalt-ion ($Co^{2+}$) and uniformly disperses on the surface of the nickel hydroxide. When a battery is first charged, the cobalt-ion ($Co^{2+}$) is oxidized into highly-conductive cobalt oxyhydroxide and forms a conductive network that bonds active materials together and also bonds the active materials and the substrate. This increases conductivity among the active materials and between the active materials and the substrate, and thus improves the utilization rate of the active materials.

In recent years, the above-described mobile electric devices are getting more and more popular and used in various ways by a wide range of users. It is anticipated that some users might forget to turn the devices off. If a device is left on, and a nickel hydrogen rechargeable battery is kept connected to load for long periods of time, the battery is discharged until voltage falls in a usable voltage range (for example, 0.8 V or higher) or below. If left standing in such a discharge state for long periods of time, the battery comes into a so-called deep discharge state.

When the battery in which the conductive network is formed inside comes into the deep discharge state, the potential of the positive electrode becomes equal to or less than a reductive potential of cobalt oxyhydroxide, so that the cobalt oxyhydroxide forming the conductive network is reduced and eluted. The reduction and elution of cobalt oxyhydroxide partially destroy the conductive network. As a result, the conductivity of the positive electrode is decreased, which deteriorates charge acceptance and lowers the utilization rate of the positive-electrode active material. For this reason, even if the battery is recharged, it is difficult to recover a charge capacity to an initial capacity value. Assuming that a recovery level of the charge capacity after deep discharge is a capacity recovery property, it can be said that the higher the capacity recovery property is, the closer to an original capacity the charge capacity gets at the time of charge after deep discharge.

Since the nickel hydrogen rechargeable battery has expanded in application, it is demanded that the capacity recovery property should be improved so that a predetermined capacity is recovered by recharging the battery even if the battery comes into the deep discharge state from being overused. Batteries designed so that the capacity recovery property is improved include an alkali storage battery disclosed in Japanese Patent No. 3191751.

In the alkali storage battery disclosed in Japanese Patent No. 3191751, a lithium-cobalt composite oxide functioning as a conducting agent is added into a positive electrode, so that a conductive network is formed by the composite oxide. Having a relatively high stability against reductive reaction, the composite oxide is unlikely to be resolved or eluted when the battery is brought into a deep discharge state.

Along with further expansion of use, nickel hydrogen rechargeable batteries are expected to be used under tough conditions. In such situations, the capacity recovery property of a conventional battery like the one disclosed in the U.S. Pat. No. 3,191,751 is not sufficient, and further improvement of the capacity recovery property has been demanded. Especially, under tough conditions, such as when the battery is repeatedly kept in the deep discharge state, the stability of cobalt against the reductive reaction is drastically decreased. As a result, the conductive network is gradually destroyed as the deep discharge is repeated, and the destroyed area grows larger. Along with this, the conductivity of the active material is decreased, and the utilization rate of the active material is also lowered. The battery repeatedly kept in the deep discharge state is therefore difficult to recover the original charge capacity even if recharged.

SUMMARY OF THE INVENTION

The inventors of the present invention considered methods of improving a capacity recovery property of a nickel hydrogen rechargeable battery after deep discharge and enhancing durability of the battery against a repeated deep discharge. In the process of the consideration, the inventors found that, in order to improve the capacity recovery property after deep discharge and the durability against the repeated deep discharge (hereinafter, these properties will be collectively referred to as a deep discharge resistance), it is necessary to enhance durability against reduction and elution of cobalt oxyhydroxide included in a conductive network formed on a surface of a positive-electrode active material, and that the durability of cobalt oxyhydroxide is affected by amount of lithium drawn into a positive electrode and a kind of a hydrogen storage alloy contained in a negative electrode. In the light of the foregoing knowledge, the inventors controlled a total amount of lithium contained in the battery and specified a hydrogen storage alloy to be used in the negative electrode. The inventors thus optimized the combination of constitutions in the nickel hydrogen rechargeable battery, and conceived of the present invention.

More specifically, in the nickel hydrogen rechargeable battery of the invention, an electrode group is sealed in a container together with alkaline electrolyte, and the electrode group is made up of positive and negative electrodes put together with a separator intervening therebetween. The nickel hydrogen rechargeable battery contains Li, and a total amount of Li in the nickel hydrogen rechargeable battery is set in a range of from 15 to 50 (mg/Ah) on the condition that the Li is converted into LiOH, and that the total amount of Li is found as a mass per Ah of positive electrode capacity. The negative electrode includes a rare earth-Mg—Ni-based hydrogen storage alloy containing a rare-earth element, Mg and Ni.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

A nickel hydrogen rechargeable battery (hereinafter, simply referred to as a battery) 2 of the invention will be described below with reference to the attached drawing. A battery used as the battery 2 to which the invention is applied is not limited in kind. The description will be provided taking as an example a case in which the invention is applied to an A-size cylindrical battery 2 shown in FIG. 1.

Figure 1:
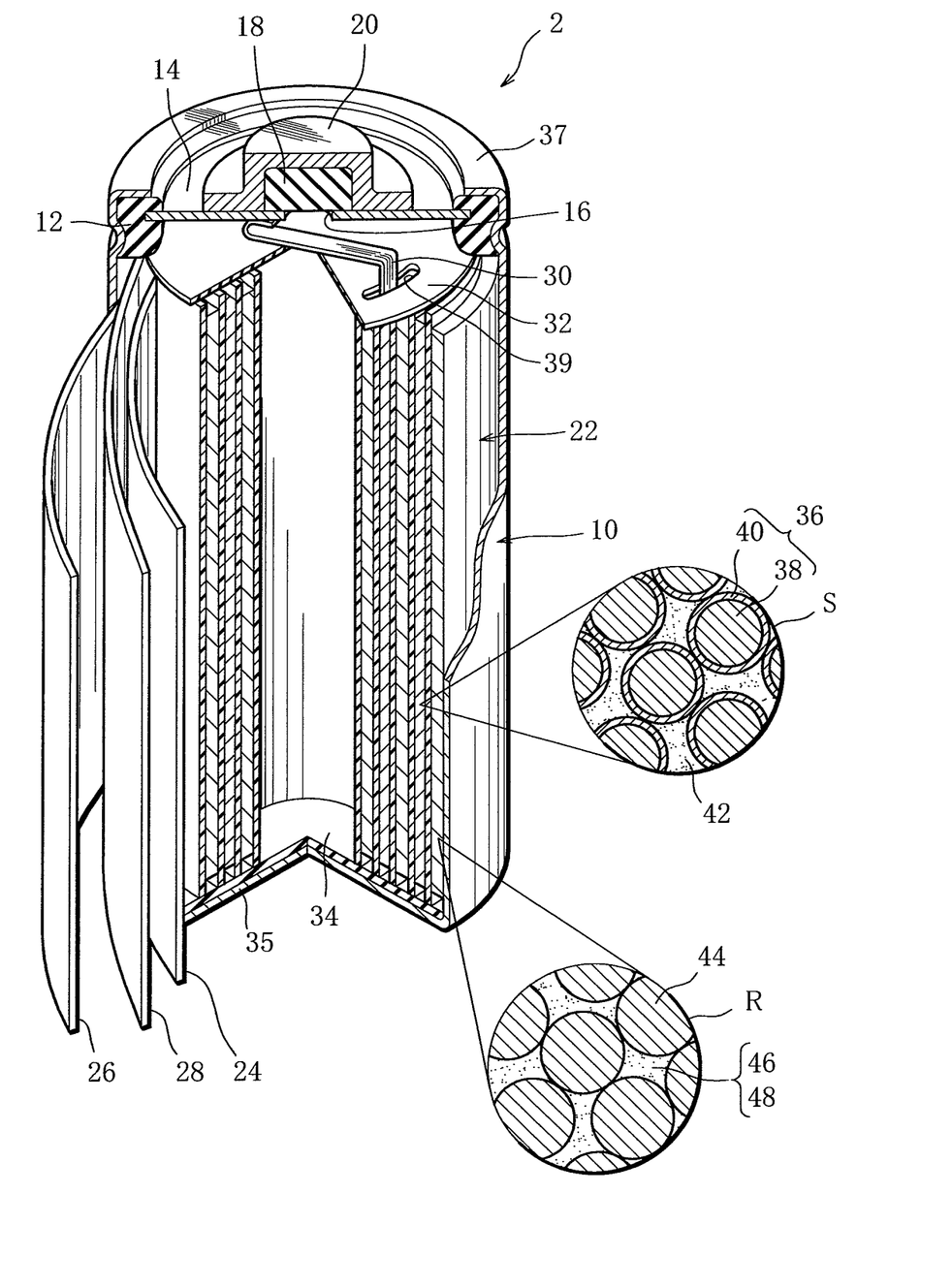
FIG. 1 is a perspective view showing a nickel hydrogen rechargeable battery according to one embodiment of the present invention, partially broken away.

As shown in FIG. 1, the battery 2 has an outer can 10 in a shape of a bottomed cylinder whose upper end is open. The outer can 10 has conductivity, and a bottom wall 35 functions as a negative terminal. Inside an opening of the outer can 10, there are disposed a disc-like conductive lid plate 14 and a ring-like insulating packing 12 fitted around the lid plate 14. The lid plate 14 and the insulating packing 12 are fixed to an opening rim 37 of the outer can 10 by caulking the opening rim 37 of the outer can 10. The lid plate 14 and the insulating packing 12 airtightly close the opening of the outer can 10 in cooperation with each other.

The lid plate 14 has a center through-hole 16 in the center thereof. Disposed on an outer face of the lid plate 14 is a rubber valve element 18 closing the center through-hole 16. A cylindrical flanged positive terminal 20 is fixed onto the outer face of the lid plate 14 so as to cover the valve element 18. The positive terminal 20 presses the valve element 18 towards the lid plate 14. The positive terminal 20 is provided with a vent hole, not shown.

In normal times, the center through-hole 16 is airtightly closed with the valve element 18. If gas is generated within the outer can 10, increasing the inner pressure of the outer can 10, the valve element 18 is compressed and opens the center through-hole 16. The gas is then released from the outer can 10 through the center through-hole 16 and the vent hole of the positive terminal 20. In short, the center through-hole 16, the valve element 18 and the positive terminal 20 form a safety valve for the battery.

The outer can 10 contains an electrode group 22. The electrode group 22 includes a positive electrode 24, a negative electrode 26 and a separator 28 each having a belt-like shape. The positive electrode 24, the negative electrode 26 and the separator 28 are rolled in spiral shape with the separator 28 sandwiched between the positive and negative electrode 24 and 26. In other words, the positive and negative electrode 24 and 26 are put together with the separator 28 intervening therebetween. An outermost periphery of the electrode group 22 is a part (outermost portion) of the negative electrode 26. The outermost portion of the negative electrode 26 is in contact with an inner circumferential wall of the outer can 10. The negative electrode 26 and the outer can 10 are electrically connected to each other.

In the outer can 10, a positive lead 30 is disposed between one end of the electrode group 22 and the lid plate 14. The positive lead 30 is connected to the positive electrode 24 at one end, and to the lid plate 14 at the other end. In this way, the positive electrode 24 is electrically connected to the positive terminal 20 via the positive lead 30 and the lid plate 14. A circular insulating member 32 is disposed between the lid plate 14 and the electrode group 22. The positive lead 30 extends through a slit 39 formed in the insulating member 32. Likewise, a circular insulating member 34 is disposed between the electrode group 22 and the bottom of the outer can 10.

A predetermined amount of alkaline electrolyte, not shown, is injected in the outer can 10. The electrode group 22 is saturated with the alkaline electrolyte. The alkaline electrolyte progresses a charge/discharge reaction between the positive electrode 24 and the negative electrode 26. There is no particular limitation in the kind of the alkaline electrolyte. For example, the electrolyte may be a sodium hydroxide aqueous solution, a lithium hydroxide aqueous solution, a potassium hydroxide aqueous solution, an aqueous solution prepared by mixing two or more of the above-mentioned aqueous solutions or the like.

The separator 28 may be made, for example, of polyamide nonwoven fabric, polyolefin nonwoven fabric, such as polyethylene and polypropylene, provided with a hydrophilic function, etc.

The positive electrode 24 includes a conductive positive substrate having a porous structure and a positive mixture held in pores of the positive substrate. The positive substrate may be, for example, a net-like, sponge-like or fibrous metal body that is plated with nickel, or a nickel foam sheet.

The positive mixture contains positive-electrode active material particles 36 and a binding agent 42 as schematically shown in a circle S in FIG. 1. The binding agent 42 binds the positive-electrode active material particles 36 together and also binds the positive mixture to the positive substrate. The binding agent 42 may be, for example, carboxymethylcellulose, methylcellulose, PTFE (polytetrafluoroethylene) dispersion, HPC (hydroxypropylcellulose) dispersion or the like.

The positive-electrode active material particles 36 each have a base particle 38 and a conductive layer 40 covering the surface of the base particle 38.

The base particle 38 is a nickel hydroxide particle or a high-order nickel hydroxide particle. Preferably, the base particles 38 have an average particle size in a range of from 8 to 20 μm. As to the non-sintered positive electrode, an increase of the surface area of the positive-electrode active material enlarges an electrode reaction area of the positive electrode and increases a power density of the battery. In this view, it is preferable that the base particles 38 serving as bases for the positive-electrode active material be small-diameter particles with an average particle size of 20 μm or less. However, if the conductive layers 40 that are deposited on the surfaces of the base particles have a substantially fixed thickness, the smaller the base particle 38 is, the higher the proportion of the conductive layer 40 is. This causes the problem that unit capacity is decreased. Furthermore, considering the fabrication yield of the base particles 38, the particle size of the base particle 38 is preferably 8 μm or larger. A further preferable particle size ranges from 10 to 16 μm.

Preferably, at least either cobalt or zinc is dissolved in the nickel hydroxide. The cobalt contributes to improvement of conductivity between the positive-electrode active material particles. The zinc prevents the positive electrode from expanding along with the progress of a charge-discharge cycle and contributes to improvement of cycle life characteristics of the battery.

As to the contents of the above elements dissolved in the nickel hydroxide particles, preferably, the content of the cobalt ranges from 2 to 6 percent by weight, and that of the zinc from 3 to 5 percent by weight, relative to the nickel hydroxide.

The base particles 38 are fabricated, for example, as below. First, a nickel sulfate aqueous solution is prepared. A sodium hydroxide aqueous solution is added little by little into the nickel sulfate aqueous solution, to thereby react the nickel sulfate aqueous solution. This way, the base particles 38 consisting of nickel hydroxide are deposited. In order to dissolve zinc and cobalt in the nickel hydroxide particles at this point, it is necessary to weigh nickel sulfate, zinc sulfate and cobalt sulfate and prepare a mixed aqueous solution of these sulfates so that the solution has a predetermined composition. While the mixed aqueous solution thus obtained is being stirred, a sodium hydroxide aqueous solution is added little by little into the mixed aqueous solution. This deposits the base particles 38 that are nickel hydroxide-based and contain zinc and cobalt dissolved therein.

The conductive layer 40 consists of a cobalt compound containing lithium (hereinafter, referred to as a lithium-containing cobalt compound). The lithium-containing cobalt compound is a compound in which lithium is incorporated into crystals of the cobalt compound, such as cobalt oxyhydroxide (CoOOH) and cobalt hydroxide ($Co(OH)_2$). The lithium-containing cobalt compound has an extremely high conductivity, and therefore forms a good conductive network that can increase the utilization rate of the active material within the positive electrode.

The conductive layer 40 is formed in the following steps. The base particles 38 are put into an ammonia aqueous solution, and a resulting solution is added with a cobalt sulfate aqueous solution. As a result, cobalt hydroxide is deposited onto the surface of the base particles 38 serving as bases, and complex particles each having a cobalt hydroxide layer are produced. The complex particles thus obtained undergo pneumatic agitation. The complex particles in such a state are sprayed with a lithium hydroxide aqueous solution while being subjected to heating treatment in which the complex particles are kept at predetermined temperature for a predetermined duration. Preferably, the heating treatment is applied to the complex particles at a temperature of 80 to 100 degrees centigrade for a duration of 30 minutes to 2 hours. As a result of the heating treatment, the cobalt hydroxide on the surfaces of the complex particles is turned into a highly-conductive cobalt compound (such as a cobalt oxyhydroxide), and also incorporates lithium at the same time. Consequently, there is provided the positive-electrode active material particles 36 each covered with the conductive layer 40 consisting of the lithium-containing cobalt compound.

Preferably, the cobalt compound serving as the conductive layer 40 contains sodium because this increases the stability of the conductive layer. To make the cobalt compound contain sodium, the sodium hydroxide aqueous solution is sprayed over the complex particles in the process of the heating treatment. In other words, not only the lithium hydroxide aqueous solution but also the sodium hydroxide aqueous solution is sprayed over the complex particles that have undergone pneumatic agitation under a high-temperature environment. By so doing, there is provided the positive-electrode active material particles 36 each covered with the conductive layer 40 consisting of the lithium-and-sodium-containing cobalt compound.

The positive electrode 24 is fabricated, for example, as below. First, positive paste is prepared, which contains the positive-electrode active material particles 36 obtained as described above, water, and the binding agent 42. The positive paste is charged into, for example, a sponge-like nickel metal body, and is then dried. After being dried, the metal body filled with nickel hydroxide particles and the like undergoes a rolling process, and is then subjected to a cutting process. This is how the positive electrode 24 is fabricated.

In the positive electrode 24 thus obtained, the positive-electrode active material particles 36 made of the base particles 38 whose surfaces are covered with the respective conductive layers 40 are in contact with one another as schematically shown in the circle S in FIG. 1, whereby the conductive network is formed by the conductive layers 40.

Preferably, the positive electrode 24 is further added with at least one kind that is selected from a group consisting of Y compounds, Nb compounds and W compounds, which serves as an additive. This additive hampers the elution of cobalt from the conductive layer and prevents the conductive network from being destroyed when the deep discharge is repeated. In this light, the additive contributes to improvement of durability against the repeated deep discharge. Preferably, the Y compound, the Nb compound and the W compound are, for example, yttrium oxide, niobium oxide and tungsten oxide, respectively.

The additive is added into the positive mixture. The content of the additive is preferably set in a range of from 0.2 to 2 parts by weight relative to 100 parts by weight of the positive-electrode active material particles. A reason for this is because if the content of the additive is below 0.2 part by weight, the effect in hampering the elution of cobalt from the conductive layer is small, and if the content is over 2 parts by weight, the effect is saturated, and the amount of the positive-electrode active material is relatively decreased, leading to decrease of capacity.

As to the battery 2 of the present invention, a total amount of Li contained in the battery is specified. The inventors considered and looked for ways to improve a deep discharge resistance of the nickel hydrogen rechargeable battery. In the process of the consideration, the inventors found that to control the amount of Li in the battery is effective in further improving the capacity recovery property after deep discharge and in improving the durability against the repeated deep discharge. The inventors thus specified a proper amount of Li in the battery. The Li will be described below in detail.

In the battery of the present invention, a total amount of Li contained in the battery, which is represented by w, is set in a range of from 15 to 50 mg/Ah on the condition that the Li is converted into LiOH, and that the total Li amount w is found as a mass per Ah of positive electrode capacity.

If the total Li amount w is below 15 mg/Ah, the effect in improving the deep discharge resistance is small. In contrast, the deep discharge resistance is improved in proportion to increase of the total amount of Li w. If the total Li amount w is over 50 mg/Ah, the low-temperature discharge property of the battery is deteriorated, so that an upper limit is set at 50 mg/Ah. Preferably, a range of the total Li amount w is set to satisfy the expression, 40 (mg/Ah)<w≤50 (mg/Ah).

As a method of maintaining Li in the form of LiOH within the battery, there are a method that applies alkali treatment to positive-electrode active material particles by using LiOH, a method that adds LiOH to alkaline electrolyte, a method that mixes LiOH into positive paste, a method that makes a separator hold LiOH, a method that applies treatment to the hydrogen storage alloy of a negative electrode with LiOH, etc. It is preferable to employ these methods independently or in combination. The method that applies the alkali treatment to the positive-electrode active material particles by using LiOH as in the above-mentioned embodiment is desirable because this method makes it easy to conduct the treatment for eccentrically locating the Li in a positive electrode. If a lithium hydroxide aqueous solution is used in the alkaline electrolyte, it is preferable to set the composition of the alkaline electrolyte close to saturation of LiOH.

The negative electrode 26 will be described below. The inventors considered and looked for ways to improve durability of the cobalt compound, such as cobalt oxyhydroxide, in the positive electrode. In this process, the inventors found that if a Mn-and-Co-containing hydrogen storage alloy, such as alloy having an $AB_5$-type structure, is used as the hydrogen storage alloy of the negative electrode, the constituents like Mn and Co are eluted into the alkaline electrolyte and reach the surface of the positive-electrode active material, leading to reduction and elution of the cobalt oxyhydroxide and the like of the conductive network. For that reason, the inventors decided to employ a rare earth-Mg—Ni-based hydrogen storage alloy that does not need Mn or Co. The negative electrode 26 containing this rare earth-Mg—Ni-based hydrogen storage alloy will be described below in detail.

The negative electrode 26 has a conductive negative substrate (core body) having a band-like shape. A negative mixture is held by the negative substrate. The negative substrate is made of a sheet-like metal member in which through-holes are dispersed. For example, the negative substrate may be a punching metal sheet or a sintered substrate obtained by applying metal powder to a die forming process and a sintering process. The negative mixture is not only charged into the through-holes of the negative substrate but also held on the both sides of the negative substrate in a layer.

The negative mixture is schematically shown in a circle R in FIG. 1, and contains hydrogen storage alloy particles 44 that can store and release hydrogen serving as the negative-electrode active material, a conducting aid 46, and a binding agent 48. The binding agent 48 binds the hydrogen storage alloy particles 44 and the conducting aid 46, and also binds the negative mixture to the negative substrate. As the binding agent 48, hydrophilic or hydrophobic polymer or the like may be used. As the conducting aid 46, carbon black or graphite may be used.

As the hydrogen storage alloy in the hydrogen storage alloy particles 44, a rare earth-Mg—Ni-based hydrogen storage alloy containing a rare-earth element, Mg and Ni is used. Specifically, the hydrogen storage alloy is a rare earth-Mg—Ni-based hydrogen storage alloy having a composition from which Mn and Co are removed. More specifically, the composition of the rare earth-Mg—Ni-based hydrogen storage alloy is expressed by a general formula:

$$Ln_{1-x}Mg_x(Ni_{1-y}T_y)_z \quad (I)$$

where Ln is at least one element selected from La, Ce, Pr, Nd, Pm, Sm, Eu, Gd, Tb, Dy, Ho, Er, Tm, Yb, Lu, Ca, Sr, Sc, Y, Yb, Er, Ti, Zr and Hf; T is at least one element selected from V, Nb, Ta, Cr, Mo, Fe, Al, Ga, Zn, Sn, In, Cu, Si, P and B; and subscripts x, y and z represent numerals that satisfy $0<x≤1$, $0≤y≤0.5$, and $2.5≤z≤4.5$, respectively.

A crystal structure of the rare earth-Mg—Ni-based hydrogen storage alloy is a so-called superlattice structure in which an $AB_2$ type and an $AB_5$ type are combined together.

The hydrogen storage alloy particles 44 are obtained, for example, as follows. First, raw metal materials are weighed and mixed to establish a predetermined composition. This mixture is melted, for example, in an induction melting furnace and formed into an ingot. The ingot thus obtained is subjected to heating treatment in which the ingot is heated under a 900 to 1200 degree-centigrade inert-gas atmosphere for 5 to 24 hours. The ingot is then pulverized into particles. These particles are subjected to sieve classification to separate desired size particles. This way, the hydrogen storage alloy particles 44 are obtained.

The negative electrode 26 is fabricated, for example, as below. First, hydrogen storage alloy powder consisting of the hydrogen storage alloy particles 44, the conducting aid 46, the binding agent 48 and water are kneaded into negative paste. The negative paste thus obtained is applied onto a negative substrate and then dried. After being dried, the negative substrate, onto which the hydrogen storage alloy particles 44 and the like are attached, is subjected to a rolling process and a cutting process, whereby the negative electrode 26 is fabricated.

The positive and negative electrodes 24 and 26 fabricated as described are rolled in spiral shape with the separator 28 intervening therebetween, and are thus formed into the electrode group 22.

The electrode group 22 thus obtained is contained in the outer can 10. A predetermined amount of alkaline electrolyte is injected into the outer can 10. The outer can 10 containing the electrode group 22 and the alkaline electrolyte is sealed with the lid plate 14 having the positive terminal 20, whereby the battery 2 according to the present invention is obtained.

As described above, the battery 2 of the present invention is characterized in that a constitution that specifies the total amount of Li contained in the battery 2 and a constitution that specifies the kind of hydrogen storage alloy contained in the negative electrode 26 are combined together. Due to the combination of the constitutions, the battery 2 of the present invention is excellent in capacity recovery property after deep discharge. Moreover, if the battery 2 is repeatedly left in a deep discharge state, the conductive network is effectively prevented from being destroyed. The battery 2 of the present invention therefore can recover a charge capacity close to an original capacity even if recharged after being repeatedly left in the deep discharge state. The battery 2 is thus an excellent battery having durability against the repeated deep discharge.

Embodiment 1

1. Production of a Battery (1) Fabrication of a Positive Electrode

Nickel sulfate, zinc sulfate and cobalt sulfate were weighed so that contents of zinc and cobalt were 4 percent by weight and 1 percent by weight, respectively, relative to a nickel content. The zinc sulfate and the cobalt sulfate were added into a sodium hydroxide aqueous solution of 1N (normality), containing ammonium ion, thereby preparing a mixed aqueous solution. While the mixed aqueous solution thus obtained was being stirred, the sodium hydroxide aqueous solution of 10N (normality) was added little by little into the mixed aqueous solution, to thereby react the mixed aqueous solution. During the reaction, pH was maintained in a range of from 13 to 14. In this manner, the base particles 38 were produced, which consisted mainly of nickel hydroxide and contained the zinc and cobalt dissolved therein.

The base particles 38 thus obtained were cleaned three times with 10 parts pure water, and then dehydrated and dried. The base particles 38 had a shape of a ball with an average particle size of 10 μm.

In the next step, the base particles 38 were put into an ammonia aqueous solution. While the pH during the reaction of the ammonia aqueous solution was maintained in a range of from 9 to 10, a cobalt sulfate aqueous solution was added into the ammonia aqueous solution. There were obtained complex particles in which the base particles 38 served as bases, and cobalt hydroxide was deposited onto the surfaces of these bases to form cobalt hydroxide layers with a thickness of approximately 0.1 μm. The complex particles underwent pneumatic agitation in high-temperature air containing oxygen at a temperature of 80 degrees centigrade. The complex particles were sprayed with a sodium hydroxide aqueous solution of 12N (normality) and a lithium hydroxide aqueous solution of 4N (normality), and were subjected to a 45-minute heating treatment. As a result, the cobalt hydroxide on the surfaces of the complex particles was turned into highly-conductive cobalt oxyhydroxide. At the same time, sodium and lithium were incorporated into the layers of cobalt oxyhydroxide, thereby forming the conductive layers 40 made of a sodium-and-lithium-containing cobalt compound. The particles with the cobalt oxyhydroxide layers were strained, washed with water, and then dried at a temperature of 60 degrees centigrade. In this manner, there were obtained the positive-electrode active material particles 36 having the conductive layers 40 made of sodium-and-lithium-containing cobalt oxyhydroxide on the surfaces of the base particles 38.

A dispersion liquid containing 0.3 part by weight of yttrium oxide, 0.2 part by weight of HPC (binding agent 42) and 0.2 part by weight of PTFE (binding agent 42) was mixed into 100 parts by weight of the positive-electrode active material particles fabricated as described above, to thereby prepare positive-electrode active material paste. The positive-electrode active material paste was applied and charged into a nickel foam sheet serving as a positive substrate. The nickel foam sheet attached with the positive-electrode active material particles was dried and subjected to a rolling process and a cutting process, whereby the positive electrode 24 containing lithium was obtained. As shown in the circle S in FIG. 1, the positive mixture contained in the positive electrode was formed so that the positive-electrode active material particles 36 made of the base particles 38 whose surfaces were covered with the conductive layers 40 were in contact with one another. The conductive network was thus formed by the conductive layers 40.

(2) Fabrication of Hydrogen Storage Alloy and a Negative Electrode

First, a rare-earth constituent was prepared, which contains 60 percent by weight of lanthanum, 20 percent by weight of samarium, 5 percent by weight of praseodymium, and 15 percent by weight of neodymium. The obtained rare-earth constituent, nickel, magnesium, and aluminum were weighed, and a mixture was prepared so that the rare-earth constituent, the nickel, the magnesium and the aluminum were 0.90:0.10:3.40:0.10 in molar ratio. The obtained mixture was melted in an induction melting furnace and formed into an ingot. The ingot was subjected to heating treatment in which the ingot was heated under a 1000 degree-centigrade argon-gas atmosphere for 10 hours, thereby forming a hydrogen storage alloy ingot having a composition of $(La_{0.60}Sm_{0.20}Pr_{0.05}Nd_{0.15})_{0.90}Mg_{0.10}Ni_{3.40}Al_{0.10}$. In the next step, the ingot was mechanically pulverized and sieved under an inert-gas atmosphere, thereby separating powder made of hydrogen storage alloy particles classified into a range from 400 to 200 mesh size. The hydrogen storage alloy powder thus obtained was measured in particle size distribution, and it was found that the average particle size of the hydrogen storage alloy particles was 60 μm.

0.4 part by weight of sodium polyacrylate, 0.1 part by weight of carboxymethylcellulose, 1.0 part by weight (in solid content equivalent) of styrene-butadiene rubber (SBR) dispersion (50 percent by weight in solid content), 1.0 part by weight of carbon black, and 30 parts by weight of water were added into 100 parts by weight of the hydrogen storage alloy powder obtained as described above. The mixture was kneaded into negative paste.

The negative paste was uniformly applied onto both sides of a metal porous sheet serving as a negative substrate so as to be constant in thickness. The porous sheet had a thickness of 60 μm and was plated with nickel on a surface thereof.

After the paste was dried, the porous sheet attached with the hydrogen storage alloy powder was further subjected to the rolling process and the cutting process. This way, the negative electrode 26 for A-size battery, which contained the hydrogen storage alloy with a superlattice structure, was fabricated.

(3) Assembly of a Nickel Hydrogen Rechargeable Battery

The positive and negative electrodes 24 and 26 were rolled in spiral shape with the separator 28 sandwiched therebetween, whereby the electrode group 22 was fabricated. The separator 28 used to fabricate the electrode group 22 was made of polypropylene nonwoven fabric and had a thickness of 0.1 mm (40 $g/m^2$ in fiber density).

The electrode group 22 was contained in the outer can 10 having a bottomed cylinder-like shape. Also, a predetermined amount of alkaline electrolyte made of aqueous solution containing KOH, NaOH and LiOH was injected into the outer can 10. Concentrations of KOH, NaOH, and LiOH were set to 5N (normality), 3.0N (normality), and 0.7N (normality), respectively. The opening of the outer can 10 was closed with the lid plate 14 or the like. An A-size nickel hydrogen rechargeable battery 2 having a nominal capacity of 2700 mAh was thus obtained. This nickel hydrogen rechargeable battery will be called a battery A.

The mass of LiOH contained in the alkaline electrolyte in the battery A was 33 mg. TABLE 1 shows this value as LiOH amount in the electrolyte. The total mass of LiOH contained in the battery A was 61 mg. TABLE 1 shows this value as LiOH amount in the battery. The mass of LiOH per unit capacity of the positive electrode based upon the LiOH amount in the battery was 23 mg/Ah. TABLE 1 shows this value as LiOH amount per unit capacity.

(4) Initial Activation Processing

The battery A was charged at a temperature of 25 degrees centigrade with a charging current of 0.1 C for 16 hours. An initial activation processing was conducted twice, in which the battery A was discharged with a discharging current of 0.2

C until battery voltage reached 0.5 V. In this manner, the battery A in a usable condition was obtained.

Embodiments 2 to 4

The concentration of the lithium hydroxide aqueous solution sprayed over the complex particles was properly changed, and the mass of LiOH per unit capacity of the positive electrode installed in the battery was changed as shown in TABLE 1. Other than that, nickel hydrogen rechargeable batteries (batteries B to D) were obtained in the same manner as with the battery A of Embodiment 1.

Embodiment 5

When the positive electrode was fabricated, 0.6 part by weight of niobium oxide powder was further added into the positive paste as an additive. A nickel hydrogen rechargeable battery (battery E) similar to the battery A of Embodiment 1, except for the foregoing respect, was obtained. The mass of LiOH per unit capacity of the positive electrode in the battery E was 23 mg/Ah.

Comparative Example 1

When the positive electrode was fabricated, the complex particles were sprayed only with a sodium hydroxide aqueous solution of 12N (normality) and subjected to heating treatment so that lithium was not contained in the conductive layers. Also, the hydrogen storage alloy that was used in the negative electrode had the $AB_5$-type structure in which the composition was $MmNi_{3.80}Co_{0.70}Al_{0.30}Mn_{0.40}$ (Mm represents misch metal). Other than that, a nickel hydrogen rechargeable battery (battery F) was obtained in the same manner as with the battery A of Embodiment 1. The mass of LiOH per unit capacity of the positive electrode in the battery F was 12 mg/Ah.

Comparative Example 2

When the positive electrode was fabricated, the complex particles were sprayed only with a sodium hydroxide aqueous solution of 12N (normality) and subjected to heating treatment so that lithium was not contained in the conductive layers. Other than that, a nickel hydrogen rechargeable battery (battery G) was obtained in the same manner with the battery A of Embodiment 1. The mass of LiOH per unit capacity of the positive electrode in the battery G was 12 mg/Ah.

Comparative Example 3

An $AB_5$-type hydrogen storage alloy with a composition of $MmNi_{3.80}Co_{0.70}Al_{0.30}Mn_{0.40}$ (Mm represents misch metal) was used when the negative electrode was fabricated. Other than that, a nickel hydrogen rechargeable battery (battery H) was obtained in the same manner as with the battery A of Embodiment 1. The mass of LiOH per unit capacity of the positive electrode in the battery H was 23 mg/Ah.

Comparative Example 4

The concentration of a lithium hydroxide aqueous solution sprayed over the complex particles was properly changed, and the mass of LiOH per unit capacity of the positive electrode installed in the battery was set to 51 mg/Ah. Other than that, a nickel hydrogen rechargeable battery (battery I) was obtained in the same manner as with the battery A of Embodiment 1.

2. Evaluation of Nickel Hydrogen Rechargeable Batteries (1) Capacity Recovery Rate after Deep Discharge The batteries A to I that had undergone the initial activation processing were subjected to so-called $-\Delta V$ charge in which after battery voltage reached a maximum value under a 25 degree-centigrade atmosphere with a charging current of 1.0 C, the batteries were charged until the battery voltage dropped 10 mV (hereinafter, simply referred to as $-\Delta V$ charge). Subsequently, on the condition that the batteries were discharged until the battery voltage reached 0.8 V under the same atmosphere with a current of 1.0 C, discharge capacities of the batteries were measured. The discharge capacities thus measured will be called initial capacities. In the next step, a $2\Omega$ resistor was connected between the positive and negative terminals of each of the batteries. The batteries were left standing under a 60 degree-centigrade atmosphere for 14 days and brought into a deep discharge state. The batteries were subjected to the $-\Delta V$ charge under a 25 degree-centigrade atmosphere with a charging current of 1.0 C, and then discharged under the same atmosphere with a current of 1.0 C until the battery voltage reached 0.8 V. This process was 1 cycle, and the discharge capacities after the cycle was conducted once were measured. The discharge capacity was used as a capacity after a battery was left standing for one cycle. A discharge capacity after the one cycle was repeated three times was also measured. This discharge capacity was used as a capacity after a battery was left for three cycles. A capacity recovery rate after 1-cycle deep discharge (%), which was expressed by formula (II), and a capacity recovery rate after 3-cycle deep discharge (%), which was expressed by formula (III), were found.

Capacity recovery rate after 1-cycle deep discharge=(capacity after a battery is left standing for one cycle/initial capacity)×100    (II)

Capacity recovery rate after 3-cycle deep discharge=(capacity after a battery is left standing for three cycles/initial capacity)×100    (III)

Results are shown in TABLE 1.

(2) Low-Temperature Discharge Property

The batteries A to I that had undergone the initial activation processing were subjected to the $-\Delta V$ charge with a charging current of 0.1 C and then left standing under a $-10$ degree-centigrade low-temperature atmosphere for three hours. In addition, the batteries were left standing until the battery voltages reached 0.8 V under the same low-temperature atmosphere with a discharging current of 0.1 C. The discharge capacities of the batteries at this time were measured. A ratio between each of the batteries and the discharge capacity was obtained, using the discharge capacity of the battery F of Comparative Example 1 as 100. Results are also shown in TABLE 1 as low-temperature discharge property ratio.

TABLE 1

| Battery | | Presence of Li in positive electrode | Kind of hydrogen storage alloy | LiOH amount in electrolyte (mg) | LiOH amount in battery (mg) | LiOH amount per unit capacity (mg/Ah) | Capacity recovery rate after 1-cycle deep discharge (%) | Capacity recovery rate after 3-cycle deep discharge (%) | Low-temperature discharge property ratio |
|---|---|---|---|---|---|---|---|---|---|
| Embodiment 1 | A | Containing Li | Rare earth-Mg—Ni-based | 33 | 61 | 23 | 100 | 90 | 110 |
| Embodiment 2 | B | Containing Li | Rare earth-Mg—Ni-based | 33 | 75 | 28 | 101 | 92 | 121 |
| Embodiment 3 | C | Containing Li | Rare earth-Mg—Ni-based | 33 | 107 | 40 | 101 | 93 | 117 |
| Embodiment 4 | D | Containing Li | Rare earth-Mg—Ni-based | 33 | 134 | 50 | 101 | 94 | 108 |
| Embodiment 5 | E | Containing Li | Rare earth-Mg—Ni-based | 33 | 61 | 23 | 100 | 97 | 110 |
| Comparative Example 1 | F | No Li | AB$_5$ type | 33 | 33 | 12 | 90 | 78 | 100 |
| Comparative Example 2 | G | No Li | Rare earth-Mg—Ni-based | 33 | 33 | 12 | 96 | 80 | 108 |
| Comparative Example 3 | H | Containing Li | AB$_5$ type | 33 | 61 | 23 | 97 | 85 | 102 |
| Comparative Example 4 | I | Containing Li | Rare earth-Mg—Ni-based | 33 | 138 | 51 | 100 | 94 | 92 |

(3) Results Shown in TABLE 1

(i) In the battery A of Embodiment 1, including a constitution in which the LiOH amount per unit capacity of the positive electrode in the battery is 23 mg/Ah and a constitution in which a rare earth-Mg—Ni-based hydrogen storage alloy is used as the hydrogen storage alloy contained in the negative electrode, a capacity recovery rate after 1-cycle deep discharge is 100 percent. The original capacity and the capacity when the battery A is recharged after deep discharge are equal. In other words, if the battery A comes into a deep discharge state, the capacity thereof can be recovered to the original capacity. The capacity recovery rate after 3-cycle deep discharge is 90 percent. If the battery A is recharged after being repeatedly left in the deep discharge state, the capacity can be recovered to 90 percent of the original capacity.

In the battery A of Embodiment 1, the relatively large amount of Li improved the conductivity of the positive-electrode active material and increased the utilization rate of the active material, and the use of the rare earth-Mg—Ni-based hydrogen storage alloy that did not require Mn and Co, as the hydrogen storage alloy, prevented the reduction and elution of the cobalt oxyhydroxide, attributable to Mn and Co. A possible reason for the result shown in TABLE 1 is that there was a synergy effect between these factors.

(ii) As to the battery F of Comparative Example 1, in which the LiOH amount per unit capacity of the positive electrode in the battery is 12 mg/Ah, and the AB$_5$-type hydrogen storage alloy containing Mn and Co included in the negative electrode is used as the hydrogen storage alloy, the capacity recovery rate after 1-cycle deep discharge and the capacity recovery rate after 3-cycle deep discharge are lower than values the battery A of Embodiment 1.

It can be considered that when the battery F of Comparative Example 1 comes into a deep discharge state, and the positive potential becomes equal to or lower than a reductive potential of cobalt oxyhydroxide, the cobalt oxyhydroxide on the surface of the positive-electrode active material is reduced and eluted, so that the destruction of the conductive network progresses. This decreased the conductivity and discouraged a sufficient capacity recovery, leading to a decrease in capacity after deep discharge. The capacity after 3-cycle deep discharge was then decreased because the repeated deep discharge further promotes the reduction and elution of cobalt oxyhydroxide.

(iii) As to the battery G of Comparative Example 2 in which the LiOH amount per unit capacity of the positive electrode in the battery is 12 mg/Ah, and the rare earth-Mg—Ni-based hydrogen storage alloy is used as the hydrogen storage alloy included in the negative electrode, the capacity recovery rate after 1-cycle deep discharge is higher than that of the battery F of Comparative Example 1, but lower than that of the battery A of Embodiment 1. The capacity recovery rate after 3-cycle deep discharge is 80 percent, which is not a sufficient value.

This is because, in the battery G of Comparative Example 2, the reduction and elution of cobalt oxyhydroxide, attributable to Mn and Co, were prevented by using the rare earth-Mg—Ni-based hydrogen storage alloy that did not contain Mn and Co, so that the capacity recovery rate after 1-cycle deep discharge became higher than that of the battery F of Comparative Example 1. However, durability was not sufficiently exerted against the repeated deep discharge, and the reduction and elution of cobalt oxyhydroxide were not prevented.

(iv) As to the battery H of Comparative Example 3, in which the LiOH amount per unit capacity of the positive electrode in the battery is 23 mg/Ah, and the AB$_5$-type hydrogen storage alloy containing Mn and Co is used as the hydrogen storage alloy included in the negative electrode, the capacity recovery rate after 1-cycle deep discharge is higher than that of the battery F of Comparative Example 1, but lower than that of the battery A of Embodiment 1. The capacity recovery rate after 3-cycle deep discharge is 85 percent, which is not a sufficient value.

Since the Li amount in the battery H of Comparative Example 3 was increased, and the conductivity of cobalt oxyhydroxide was improved, it can be considered that the battery H became higher in capacity recovery rate after 1-cycle deep discharge than the battery F of Comparative Example 1. However, durability was not sufficiently exerted against the repeated deep discharge, and the reduction and elution of cobalt oxyhydroxide were not prevented.

(v) As to the batteries B to D of Embodiments 2 to 4 in which the LiOH amount per unit capacity of the positive electrode in the batteries are increased, especially the capacity recovery rate after 3-cycle deep discharge is higher than that of the battery A. This way, an improvement is seen in durability against the repeated deep discharge.

(vi) The battery I of Comparative Example 4 in which the LiOH amount per unit capacity of the positive electrode in the battery shows a relatively high value of the capacity recovery rate after 3-cycle deep discharge, but the low-temperature discharge property is low. This proves that although an increase of the LiOH amount is effective in improving durability against the repeated deep discharge, an excessive increase thereof deteriorates the low-temperature discharge property.

(vii) It can be said from the foregoing fact that combination between a constitution in which the LiOH amount per unit capacity of the positive electrode in the battery is in a range of from 15 to 50 mg/Ah and a constitution in which the rare earth-Mg—Ni-based hydrogen storage alloy is used as the hydrogen storage alloy included in the negative electrode is effective in improving the deep discharge resistance of the battery.

(viii) The battery E of the Embodiment 5 having a constitution obtained by adding niobium oxide as a positive-electrode additive into the constitution of the battery A of Embodiment 1 is further improved in the capacity recovery rate after 3-cycle deep discharge. In this light, the battery E proves that the addition of niobium oxide is effective in improving the durability against the repeated deep discharge.

The present invention is not limited to the above-described aspects and embodiments, and may be modified in various ways. For example, the nickel hydrogen battery may be a square-shaped battery, and there is no particular limitation in mechanical constitution. The rare earth-Mg—Ni-based hydrogen storage alloy used in the negative electrode is not limited to the composition mentioned in the embodiments. As long as the hydrogen storage alloy having a composition defined by the general formula (I) is used, the same effect can be obtained. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A nickel hydrogen rechargeable battery in which an electrode group is sealed in a container together with alkaline electrolyte, and the electrode group is made up of positive and negative electrodes put together with a separator intervening therebetween, wherein
   the nickel hydrogen rechargeable battery contains LiOH, and a total amount of LiOH in the nickel hydrogen rechargeable battery is in a range of 15 mg/Ah of positive electrode capacity to 50 mg/Ah of positive electrode capacity;
   the negative electrode includes: a rare earth-Mg—Ni-based hydrogen storage alloy containing a rare-earth element, Mg and Ni.

2. The nickel hydrogen rechargeable battery according to claim 1, wherein the rare earth-Mg—Ni-based hydrogen storage alloy is free of Mn and Co.

3. The nickel hydrogen rechargeable battery according to claim 2, wherein the rare earth-Mg—Ni-based hydrogen storage alloy has a composition that is expressed by a general formula:

$$Ln_{1-x}Mg_x(Ni_{1-y}T_y)_z,$$

where Ln is at least one element selected from La, Ce, Pr, Nd, Pm, Sm, Eu, Gd, Tb, Dy, Ho, Er, Tm, Yb, Lu, Ca, Sr, Sc, Y, Yb, Er, Ti, Zr and Hf; T is at least one element selected from V, Nb, Ta, Cr, Mo, Fe, Al, Ga, Zn, Sn, In, Cu, Si, P and B; and subscripts x, y and z represent numerals that satisfy $0<x\leq 1$, $0\leq y\leq 0.5$, and $2.5\leq z\leq 4.5$, respectively.

4. The nickel hydrogen rechargeable battery according to claim 1, wherein the positive electrode includes:
   positive-electrode active material particles; and
   the positive-electrode active material particles each include:
   a base particle comprising nickel hydroxide and
   a conductive layer comprising a Co compound containing Li, wherein the conductive layer covers a surface of the base particle.

5. The nickel hydrogen rechargeable battery according to claim 1, wherein the rare earth-Mg—Ni-based hydrogen storage alloy is free of Mn and Co;
   the positive electrode includes positive-electrode active material particles; and
   the positive-electrode active material particles each include:
   a base particle comprising nickel hydroxide and
   a conductive layer comprising a Co compound containing Li, wherein the conductive layer covers a surface of the base particle.

6. The nickel hydrogen rechargeable battery according to claim 1, wherein the rare earth-Mg—Ni-based hydrogen storage alloy is free of Mn and Co, and has a composition expressed by a general formula: $Ln_{1-x}Mg_x(Ni_{1-y}T_y)_z$, where Ln is at least one element selected from La, Ce, Pr, Nd, Pm, Sm, Eu, Gd, Tb, Dy, Ho, Er, Tm, Yb, Lu, Ca, Sr, Sc, Y, Yb, Er, Ti, Zr and Hf; T is at least one element selected from V, Nb, Ta, Cr, Mo, Fe, Al, Ga, Zn, Sn, In, Cu, Si, P and B; and subscripts x, y and z represent numerals that satisfy $0<x\leq 1$, $0\leq y\leq 0.5$, and $2.5\leq z\leq 4.5$, respectively;
   the positive electrode includes
   positive-electrode active material particles; and
   the positive-electrode active material particles each include:
   a base particle comprising nickel hydroxide and
   a conductive layer comprising a Co compound containing Li, wherein the conductive layer covers a surface of the base particle.

7. The nickel hydrogen rechargeable battery according to claim 1, wherein the positive electrode comprises at least one additive selected from a group consisting of Y compounds, Nb compounds, and W compounds.

8. The nickel hydrogen rechargeable battery according to claim 1, wherein the rare earth-Mg—Ni-based hydrogen storage alloy is free of Mn and Co, and
the positive electrode includes:
at least one additive selected from a group consisting of Y compounds, Nb compounds, and W compounds.

9. The nickel hydrogen rechargeable battery according to claim 1, wherein the rare earth-Mg—Ni-based hydrogen storage alloy is free of Mn and Co, and has a composition expressed by a general formula: $Ln_{1-x}Mg_x(Ni_{1-y}T_y)_z$, where Ln is at least one element selected from La, Ce, Pr, Nd, Pm, Sm, Eu, Gd, Tb, Dy, Ho, Er, Tm, Yb, Lu, Ca, Sr, Sc, Y, Yb, Er, Ti, Zr and Hf; T is at least one element selected from V, Nb, Ta, Cr, Mo, Fe, Al, Ga, Zn, Sn, In, Cu, Si, P and B; and subscripts x, y and z represent numerals that satisfy $0<x\le1$, $0\le y\le0.5$, and $2.5\le z\le4.5$, respectively; and
the positive electrode includes:
at least one additive selected from a group consisting of Y compounds, Nb compounds, and W compounds.

10. The nickel hydrogen rechargeable battery according to claim 1, wherein
the positive electrode includes:
positive-electrode active material particles and
at least one additive selected from a group consisting of Y compounds, Nb compounds, and W compounds, and
the positive-electrode active material particles each include:
a base particle comprising nickel hydroxide and
a conductive layer comprising a Co compound containing Li, wherein the conductive layer covers a surface of the base particle.

11. The nickel hydrogen rechargeable battery according to claim 1, wherein
the rare earth-Mg—Ni-based hydrogen storage alloy is free of Mn and Co;
the positive electrode includes:
positive-electrode active material particles and
at least one additive selected from a group consisting of Y compounds, Nb compounds, and W compounds; and
the positive-electrode active material particles each include:
a base particle comprising nickel hydroxide and
a conductive layer comprising a Co compound containing Li, wherein the conductive layer covers a surface of the base particle.

12. The nickel hydrogen rechargeable battery according to claim 1, wherein the rare earth-Mg—Ni-based hydrogen storage alloy is free of Mn and Co, and has a composition expressed by a general formula: $Ln_{1-x}Mg_x(Ni_{1-y}T_y)_z$, where Ln is at least one element selected from La, Ce, Pr, Nd, Pm, Sm, Eu, Gd, Tb, Dy, Ho, Er, Tm, Yb, Lu, Ca, Sr, Sc, Y, Yb, Er, Ti, Zr and Hf; T is at least one element selected from V, Nb, Ta, Cr, Mo, Fe, Al, Ga, Zn, Sn, In, Cu, Si, P and B; and subscripts x, y and z represent numerals that satisfy $0<x\le1$, $0\le y\le0.5$, and $2.5\le z\le4.5$, respectively; and
the positive electrode includes:
positive-electrode active material particles and
at least one additive selected from a group consisting of Y compounds, Nb compounds, and W compounds; and
the positive-electrode active material particles each include:
a base particle comprising nickel hydroxide and
a conductive layer comprising a Co compound containing Li, wherein the conductive layer covers a surface of the base particle.

13. The nickel hydrogen rechargeable battery according to claim 1, wherein the alkaline electrolyte contains LiOH.

14. The nickel hydrogen rechargeable battery according to claim 1, wherein the rare earth-Mg—Ni-based hydrogen storage alloy is free of Mn and Co, and the alkaline electrolyte contains LiOH.

15. The nickel hydrogen rechargeable battery according to claim 1, wherein the rare earth-Mg—Ni-based hydrogen storage alloy is free of Mn and Co, and has a composition expressed by a general formula: $Ln_{1-x}Mg_x(Ni_{1-y}T_y)_z$, where Ln is at least one element selected from La, Ce, Pr, Nd, Pm, Sm, Eu, Gd, Tb, Dy, Ho, Er, Tm, Yb, Lu, Ca, Sr, Sc, Y, Yb, Er, Ti, Zr and Hf; T is at least one element selected from V, Nb, Ta, Cr, Mo, Fe, Al, Ga, Zn, Sn, In, Cu, Si, P and B; and subscripts x, y and z represent numerals that satisfy $0<x\le1$, $0\le y\le0.5$, and $2.5\le z\le4.5$, respectively; and
the alkaline electrolyte contains LiOH.

16. The nickel hydrogen rechargeable battery according to claim 1, wherein the rare earth-Mg—Ni-based hydrogen storage alloy is free of Mn and Co, and has a composition expressed by a general formula: $Ln_{1-x}Mg_x(Ni_{1-y}T_y)_z$, where Ln is at least one element selected from La, Ce, Pr, Nd, Pm, Sm, Eu, Gd, Tb, Dy, Ho, Er, Tm, Yb, Lu, Ca, Sr, Sc, Y, Yb, Er, Ti, Zr and Hf; T is at least one element selected from V, Nb, Ta, Cr, Mo, Fe, Al, Ga, Zn, Sn, In, Cu, Si, P and B; and subscripts x, y and z represent numerals that satisfy $0<x\le1$, $0\le y\le0.5$, and $2.5\le z\le4.5$, respectively;
the positive electrode includes positive-electrode active material particles;
the positive-electrode active material particles each include:
a base particle comprising nickel hydroxide and
a conductive layer comprising a Co compound containing Li, wherein the conductive layer covers a surface of the base particle; and
the alkaline electrolyte contains LiOH.

17. The nickel hydrogen rechargeable battery according to claim 1, wherein
the rare earth-Mg—Ni-based hydrogen storage alloy is free of Mn and Co, and has a composition expressed by a general formula: $Ln_{1-x}Mg_x(Ni_{1-y}T_y)_z$, where Ln is at least one element selected from La, Ce, Pr, Nd, Pm, Sm, Eu, Gd, Tb, Dy, Ho, Er, Tm, Yb, Lu, Ca, Sr, Sc, Y, Yb, Er, Ti, Zr and Hf; T is at least one element selected from V, Nb, Ta, Cr, Mo, Fe, Al, Ga, Zn, Sn, In, Cu, Si, P and B; and subscripts x, y and z represent numerals that satisfy $0<x\le1$, $0\le y\le0.5$, and $2.5\le z\le4.5$, respectively;
the positive electrode includes:
positive-electrode active material particles and
at least one additive selected from a group consisting of Y compounds, Nb compounds, and W compounds;
the positive-electrode active material particles each include:
a base particle comprising nickel hydroxide and
a conductive layer comprising a Co compound containing Li, wherein the conductive layer covers a surface of the base particle; and
the alkaline electrolyte contains LiOH.

* * * * *